US007762510B2

(12) United States Patent
Eller

(10) Patent No.: US 7,762,510 B2
(45) Date of Patent: Jul. 27, 2010

(54) HANDSAW MOUNTING ASSEMBLIES AND MOUNTING METHODS

(76) Inventor: Randy Eller, P.O. Box 1213, Kamiah, ID (US) 83536

( * ) Notice: Subject to any disclaimer, the term of this patent is extended or adjusted under 35 U.S.C. 154(b) by 9 days.

(21) Appl. No.: 12/070,397

(22) Filed: Feb. 19, 2008

(65) Prior Publication Data

US 2008/0196257 A1 Aug. 21, 2008

Related U.S. Application Data

(60) Provisional application No. 60/902,281, filed on Feb. 20, 2007.

(51) Int. Cl.
*A47F 5/00* (2006.01)
*A47F 7/00* (2006.01)
*F16M 11/00* (2006.01)
*B60R 7/00* (2006.01)

(52) U.S. Cl. .................. 248/309.1; 248/682; 211/70.6; 211/70.7; 224/401; 224/402; 224/403

(58) Field of Classification Search ................ 30/166.3, 30/379, 379.5, 380, 381, 506, 507, 514; 248/309.1, 248/682, 218.4, 316.4, 287.1, 297.21; 224/401–403, 224/408, 410, 441, 443, 446, 281, 501, 522–525, 224/531, 533, 536, 324, 545; 296/37.16; 211/70.6–70.7, 60.1
See application file for complete search history.

(56) References Cited

U.S. PATENT DOCUMENTS

| | | | | |
|---|---|---|---|---|
| 4,307,640 | A * | 12/1981 | Michael | 83/574 |
| 4,369,575 | A * | 1/1983 | Schurman | 30/151 |
| 4,473,176 | A * | 9/1984 | Harper | 224/569 |
| 4,779,503 | A * | 10/1988 | Mitchell | 83/796 |
| 4,907,778 | A * | 3/1990 | Rockwell | 248/676 |
| 5,007,568 | A * | 4/1991 | Da Vault | 224/552 |
| 5,119,937 | A * | 6/1992 | Reynolds, Jr. | 206/349 |
| 6,648,152 | B2 * | 11/2003 | Bermes | 211/70.6 |
| 2004/0239088 | A1 * | 12/2004 | Rondeau et al. | 280/769 |
| 2008/0053930 | A1 * | 3/2008 | Rohde | 211/70.6 |

* cited by examiner

*Primary Examiner*—J. Allen Shriver, II
*Assistant Examiner*—Christopher Garft
(74) *Attorney, Agent, or Firm*—Wells St. John P.S.

(57) ABSTRACT

An assembly comprising a frame comprising a top portion and a bottom portion, the top portion being configured to removably couple a motor assembly portion of a handsaw, and the bottom portion being configured to fixedly couple a structure. A method of affixing a handsaw to a structure that includes removably coupling a motor assembly portion of the handsaw to a structure using an assembly.

1 Claim, 12 Drawing Sheets

HANDSAW MOUNTING ASSEMBLIES AND MOUNTING METHODS

CROSS REFERENCE TO RELATED APPLICATION

This application claims priority to U.S. provisional patent application 60/902,281 filed Feb. 20, 2007, entitled "Handsaw Mounting Assemblies and Mounting Methods", the entirety of which is incorporated by reference herein.

BACKGROUND OF THE DISCLOSURE

Handsaws come in many different forms. Examples of handsaws include the cut-off saw and the chainsaw. Typically, the handsaw has a motor portion attached to a blade portion. In the instance of the chainsaw the motor portion can include a rear handle and a front handle with the motor portion being coupled to a bar having a chain rotating around the bar and back through to the motor portion.

Handsaws have been transported in carrying cases and/or mounted onto scabbards for example. However, the carrying cases can be cumbersome, taking up valuable cargo space and deteriorating rapidly over time. Likewise, the use of scabbards can result in the bending of the bar of the chainsaw for example.

SUMMARY OF THE DISCLOSURE

Assemblies are provided that can include a frame comprising a top portion and a bottom portion, the top portion being configured to removably couple a motor assembly portion of a handsaw, and the bottom portion being configured to fixedly couple a structure.

Methods are provided that can include affixing a handsaw to a structure that includes removably coupling a motor assembly portion of the handsaw to a structure using an assembly.

BRIEF DESCRIPTION OF THE DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
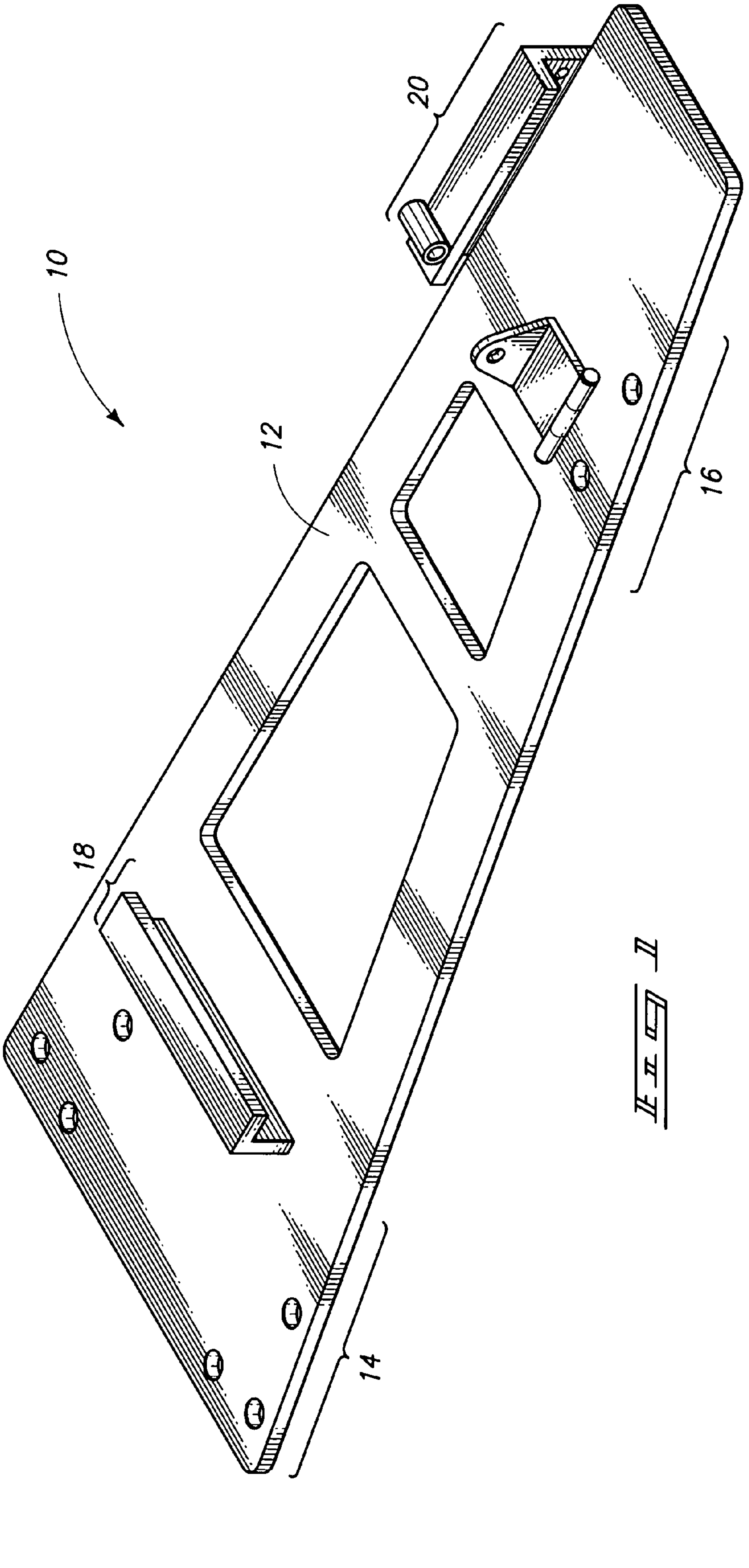
FIG. 1 is an assembly according to an embodiment.

The present disclosure provides handsaw mounting assemblies and methods of mounting handsaws. Embodiments of these assemblies and methods are described with reference to FIGS. 1-13. Referring first to FIG. 1, a mounting assembly 10 is shown that includes a frame 12 having a distal portion 14 and a proximal portion 16. Extending from distal portion 14 can be distal member 18 and extending from proximal portion 16 can be proximal member 20. Mounting assembly 10 including frame 12 as well as members 18 and 20 can be manufactured from a variety of materials. Suggested materials include aluminum, iron, and/or steel.

In accordance with example embodiments, distal portion 14 can have more surface area than proximal portion 16. As an example, distal portion 14 of mounting assembly 10 may extend to proximal portion 16 that has less width than distal portion 14. As another example, the difference in widths of these portions can be reversed; proximal portion 14 may be wider than distal portion 16.

While FIG. 1 exemplifies a mounting assembly 10 that is in one piece, it is contemplated that mounting assembly 10 can be comprised by multiple pieces. For example, distal portion 14 may be separate from proximal portion 16 with each portion configured to be separately mounted to a substrate and the respective members aligned to receive with one another to couple with a handsaw. According to another embodiment, proximal members 20 and 18 may be configured to moveably attach to frame 12. For example, to adjust for handsaws of different makes or models, distal member 18 may be configured to moveably attach to frame 12 in a sliding-locking fashion that allows distal member 18 to be adjusted along the surface area of mounting assembly 10. For example, distal member 18 may be moved more distal from proximal portion 16 and/or more lateral along frame 12. Likewise, proximal member 20 may be configured to moveably attach to frame 12 either along the lateral edge of frame 12 or along the upper portion of frame 12, for example.

Figure 2:
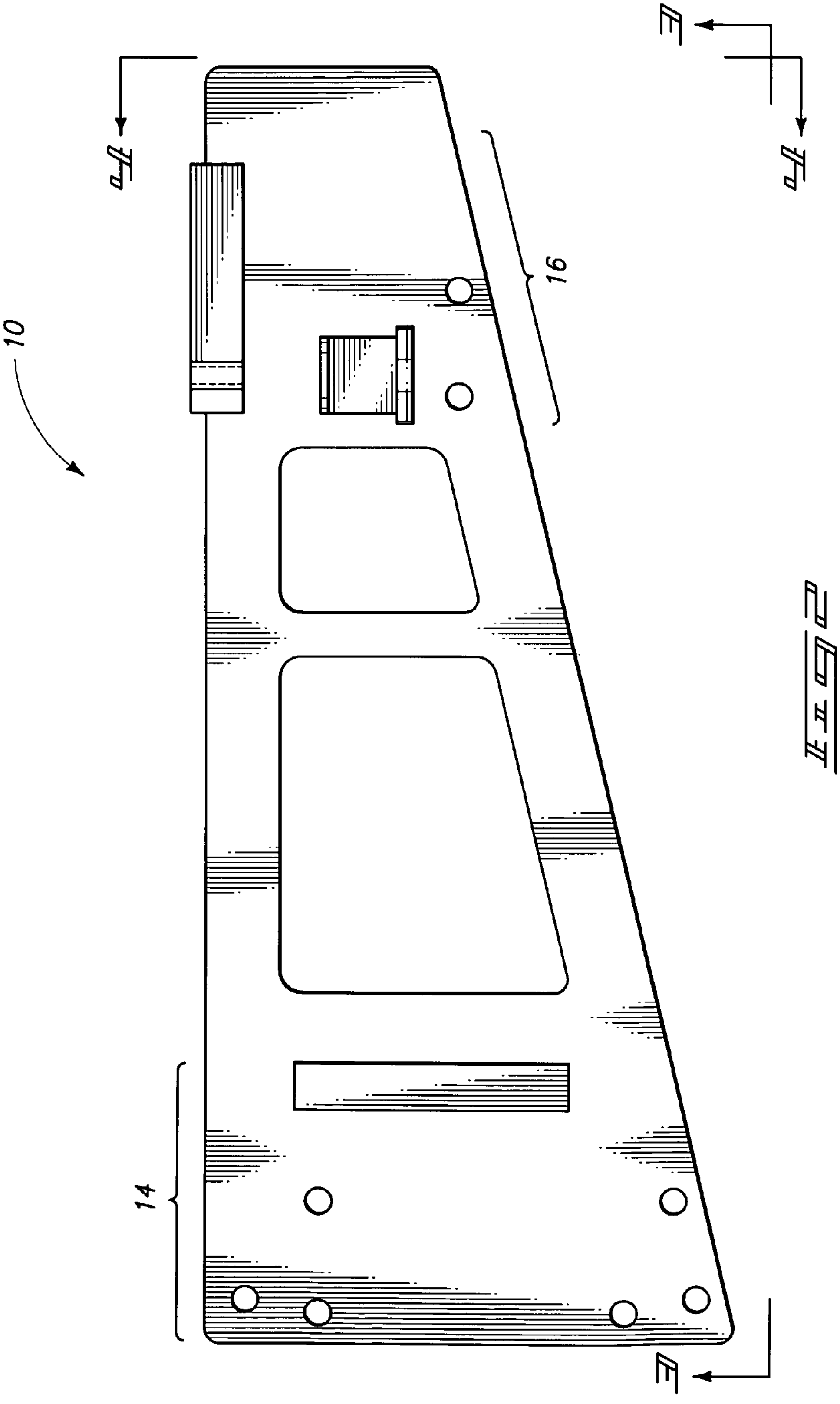
FIG. 2 is a top view of the assembly of FIG. 1 according to an embodiment.

Referring to FIG. 2, assembly 10 is shown from an upper view. According to an embodiment, distal portion 14 can have a larger surface area than proximal portion 16. Distal portion 14 can include at least two sets of openings for attaching coupling devices while proximal portion 16 can include one set of openings. It is contemplated that either one or both of portions 14 and 16 can be configured to couple with another structure. The openings shown in FIG. 2, are by way of example only and the disclosure should not be limited to assemblies having only these openings. Assembly 10 can be coupled to numerous structures using numerous coupling devices and/or mechanisms known or to be disclosed in the art. Implementations of the coupling of assembly 10 can be dictated by the structure the assembly is to be coupled. Example structures are shown in FIGS. 7-12 for example. As can be seen from the upper view of FIG. 2, side views depicted in FIGS. 3 and 4 are detailed.

Figure 3:
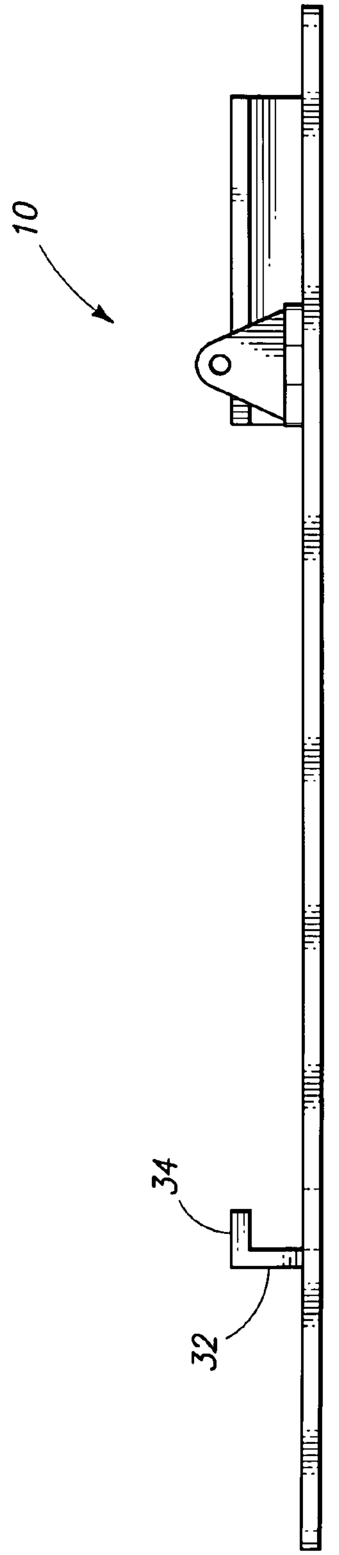
FIG. 3 is a side view of the assembly of FIG. 1 according to an embodiment.

Referring to FIG. 3, a side view of mounting assembly 10 as indicated from FIG. 2 is shown. According to an example embodiment distal member 18 includes an abutting member 32 as well as a flange member 34. Distal member 18 can be configured to couple to a distal portion of a handsaw. For example, typical handsaws include a front handle and a rear handle. According to an embodiment distal member 18 may be configured to couple to the front handle of a handsaw. The front handle of the handsaw can reside both above the motor and/or below the motor as well. According to an embodiment abutting member 32 can have a height sufficient to extend above the height of the lower portion of the front handle of the handsaw. Distal member 18 can also include flange member 34, and member 34 can extend a sufficient distance from member 34 to cover at least a top portion of the lower portion of the front handle of the handsaw, for example. According to exemplary embodiments, the lower portion of the handle of the handsaw can be slid below flange member 34 and abutting member 32 when being placed within mounting assembly 10.

According to another embodiment and specific to chainsaws, distal member 18 can be configured to receive the dogs of a chainsaw. Dogs typically appear as metal teeth below the chainsaw bar in a chainsaw configuration. According to exemplary embodiments distal member 18 can be configured to receive one or more of these dogs when a chainsaw is slid to abutting member 32. In an exemplary embodiment not shown, abutting member 32 may include orifices or one or more openings to receive the dogs of a chainsaw.

Figure 4:
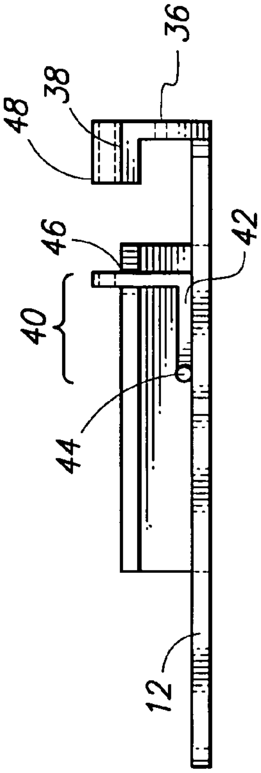
FIG. 4 is another side view of the assembly of FIG. 1 according to an embodiment.

Referring to FIG. 4, proximal member 20 can include an abutting member 36 and a flange member 38. Abutting member 36 of proximal member 20 can have a height sufficient to extend beyond the height of the lower portion of the rear handle of a handsaw. According to an example embodiment a handsaw may be first abutted against abutting member 32 and then provided to abutting member 36. Proximal member 20 can also include a flange member 38. Flange member 38 can extend from abutting member 36 to provide a receiving portion below flange member 38 to receive the rear handle of a handsaw. In accordance with an exemplary implementation, flange member 38 can include a guide member 48. Guide member 48 can be configured to receive key 56, referred to in FIG. 5, below.

According to an example embodiment, mounting assembly 10 may also include a locking mechanism 40. Locking mechanism 40 can be coupled to frame 12 of mounting assembly 10 and more particularly to proximal portion 16 of mounting assembly or of frame 12. Locking mechanism 40 can include at least two members, first member 42 being coupled to frame 12 via a hinge 44, and a flange portion 46 extending from member 42, for example. According to an embodiment, upon receipt of the rear handle below flange member 38, locking mechanism 40, particularly flange member 46, can be positioned to abut the opposing portion of the rear handle of a handsaw and secure at least a portion of the rear handle below flange 38.

Figure 5:
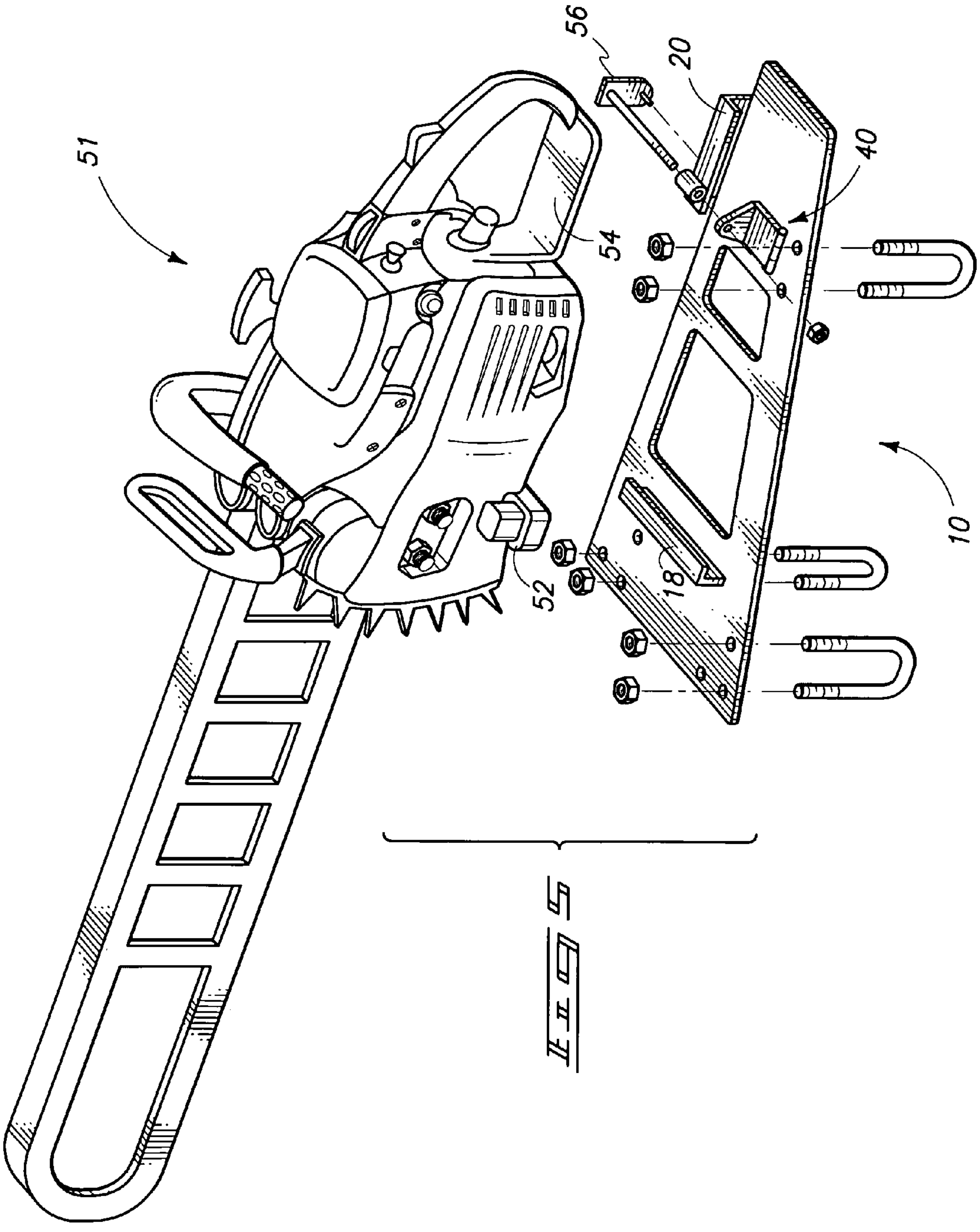
FIG. 5 is an assembly aligned with a handsaw and assembly coupling devices according to an embodiment of the disclosure.

Referring to FIG. 5, an example handsaw, shown as a chainsaw, is demonstrated above mounting assembly 10. In accordance with an embodiment, saw 51 includes a front handle lower portion 52 and a rear handle lower portion 54. As exemplified above, portion 52 can be placed to couple with distal member 18. Rear portion 54 can be placed to couple with proximal member 20. Upon placement of saw 51 within mounting assembly 10 key 56 can be used to fix locking assembly 40 in place, for example.

Figure 6:
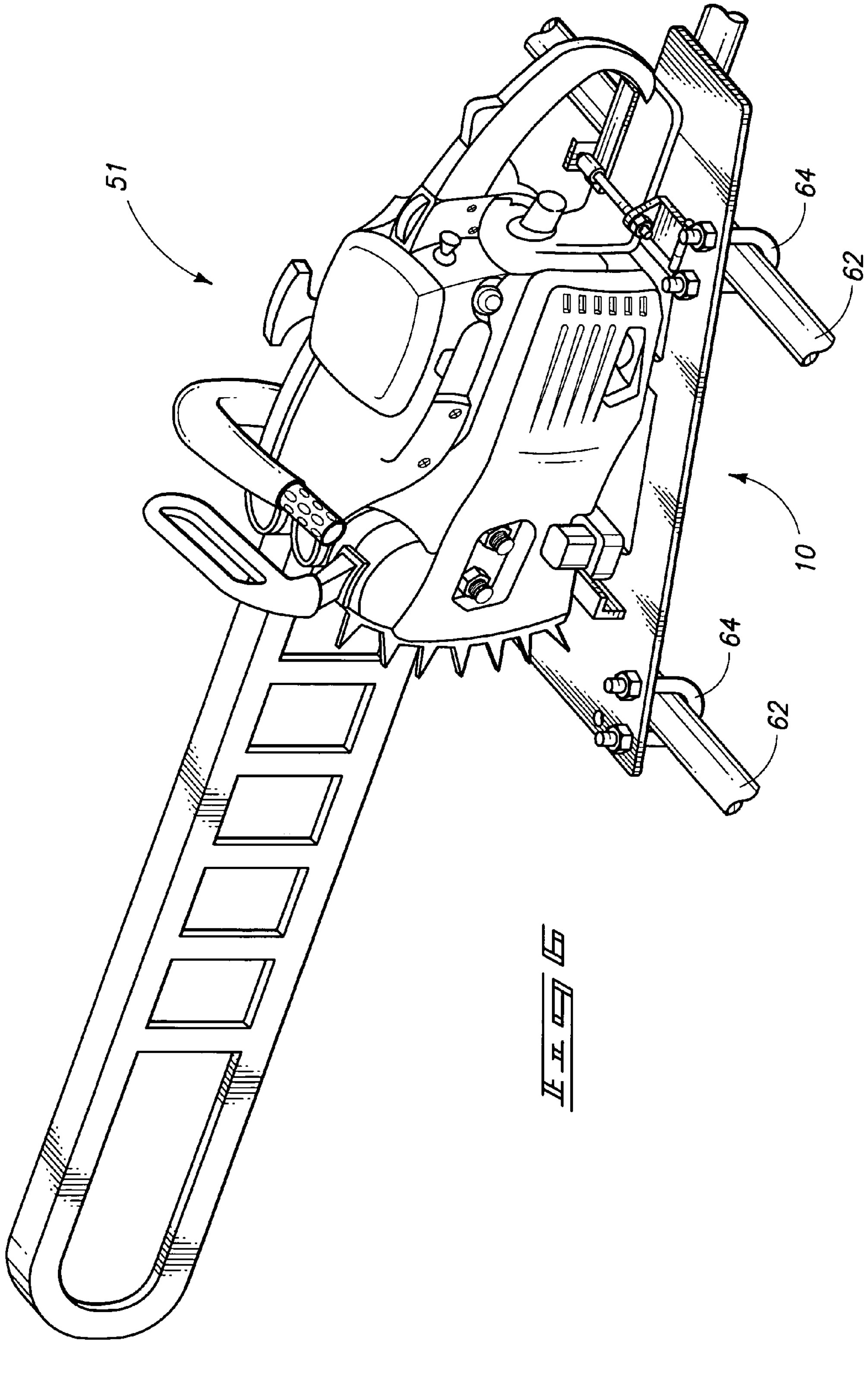
FIG. 6 is the assembly of FIG. 5 coupled to a handsaw and coupling devices according to an embodiment.

Referring to FIG. 6, saw 51 is shown coupled and/or bracketed to mounting assembly 10. Additionally, mounting assembly 10 is shown coupled to support member 62. Support member 62 can be any portion of a motor vehicle, an ATV, a snowmobile, and/or storage facility or storage area, for example. Referring to FIG. 6, assembly 10 can be coupled to support 62 utilizing U-bolts 64. Assembly 10 can be coupled to support 62 in many different ways other than U-bolt 64, for example: assembly 10 can be directly welded to support 62; support 62 can include members that can directly bolt to or attach to assembly 10; and/or assembly 10 can include members that can directly bolt to or attach to support 62.

Figure 7:
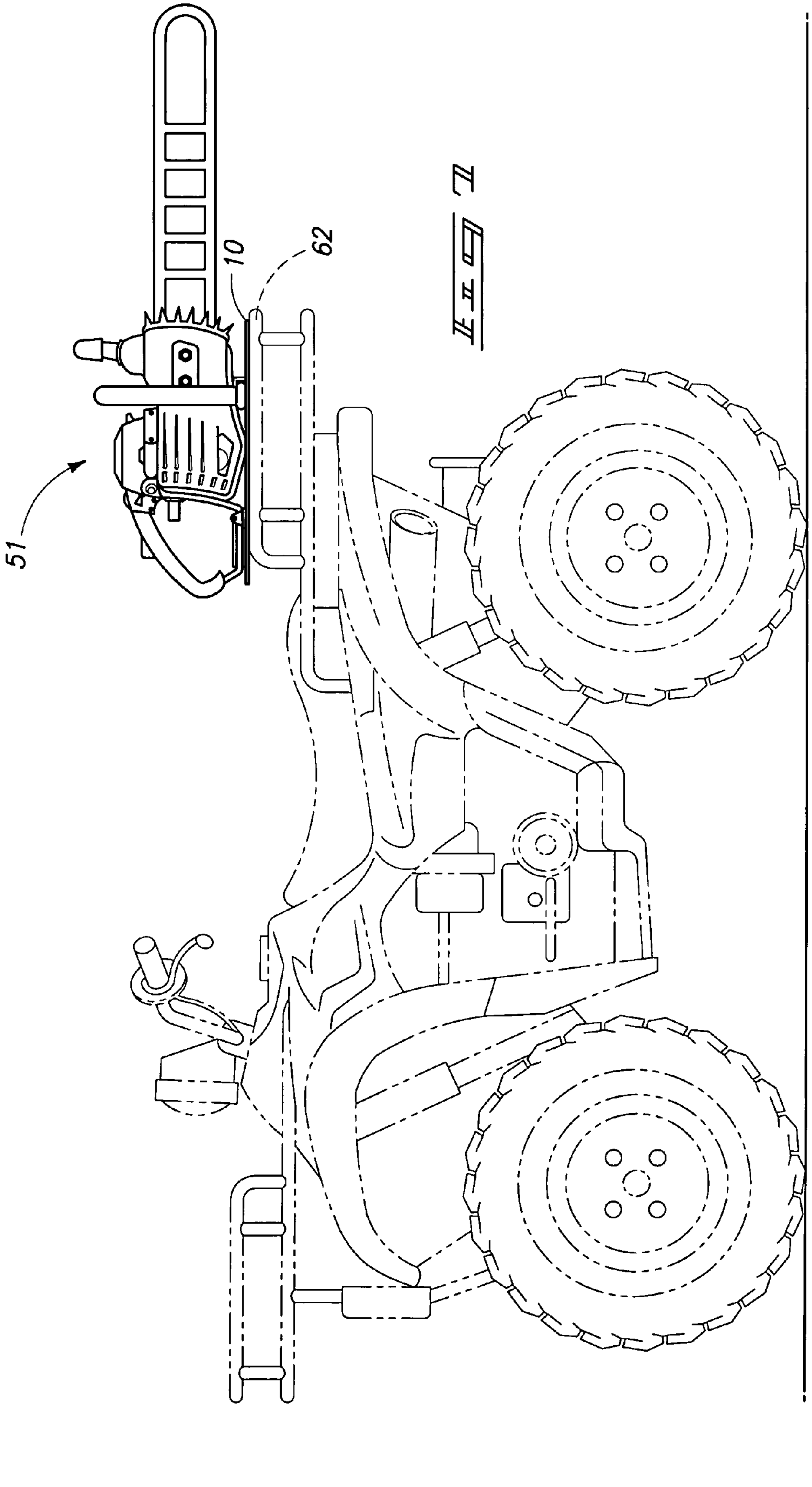
FIG. 7 is an example of an embodiment of an assembly of the present disclosure coupled to a rear portion of an all terrain vehicle.

Referring to FIG. 7, support 62 can be part of a rack that is utilized by an ATV. Accordingly, attachment of assembly 10 to support 62 can be configured to couple to the rack of an ATV. In accordance with the embodiments shown in FIG. 7, the proximal portion of assembly 10 can be proximal the driver and the distal portion can be proximal the rear of the ATV.

Figure 8:
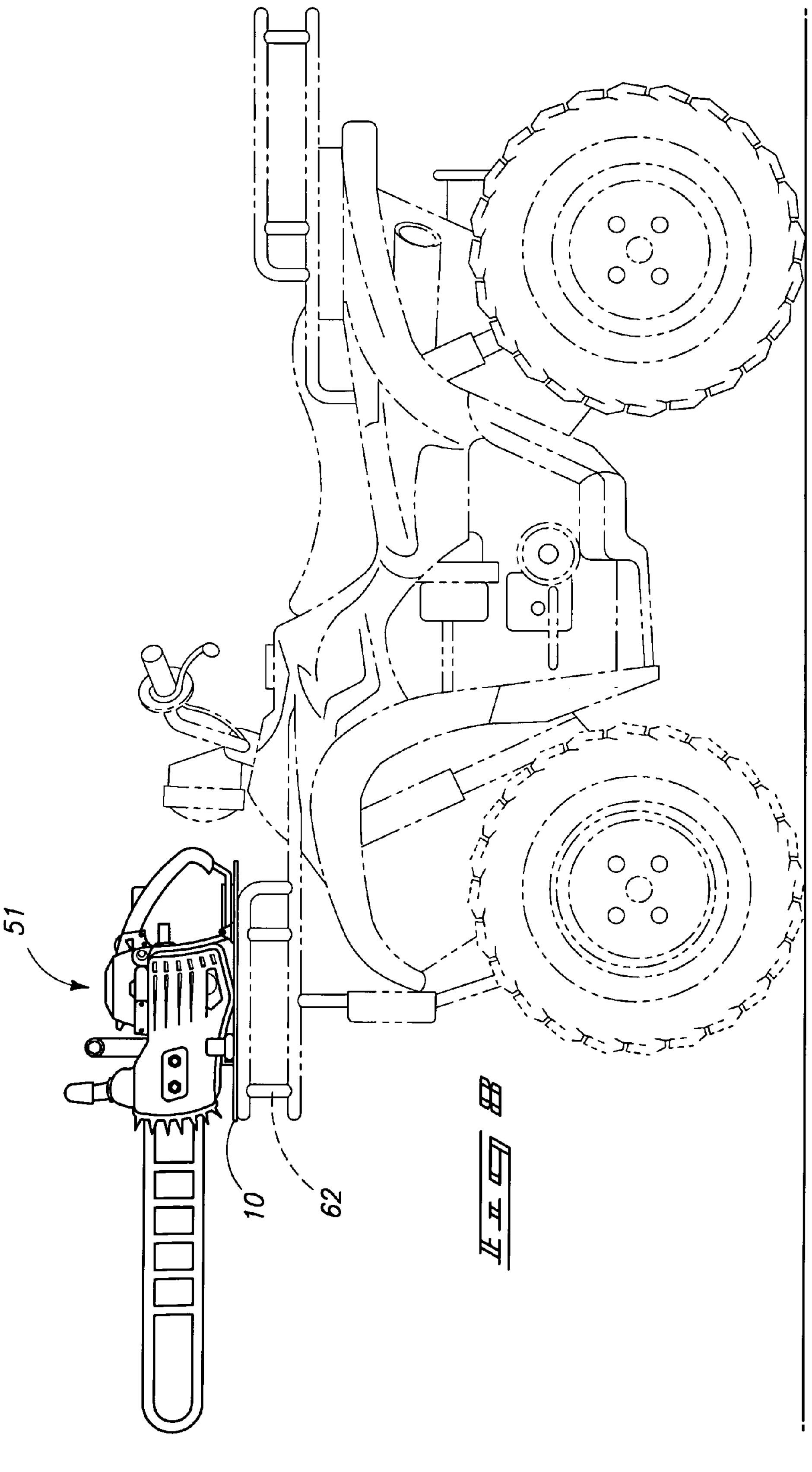
FIG. 8 is an example of an embodiment of an assembly of the present disclosure coupled to a front portion of an all terrain vehicle.

Referring to FIG. 8, assembly 10 can be mounted to a front rack system of an ATV with again the proximal portion assembly 10 proximal the driver of the ATV and the distal portion away from the driver of the ATV. As such, saw 51 can have the blade portion extending away from or in front of the ATV.

Figure 9:
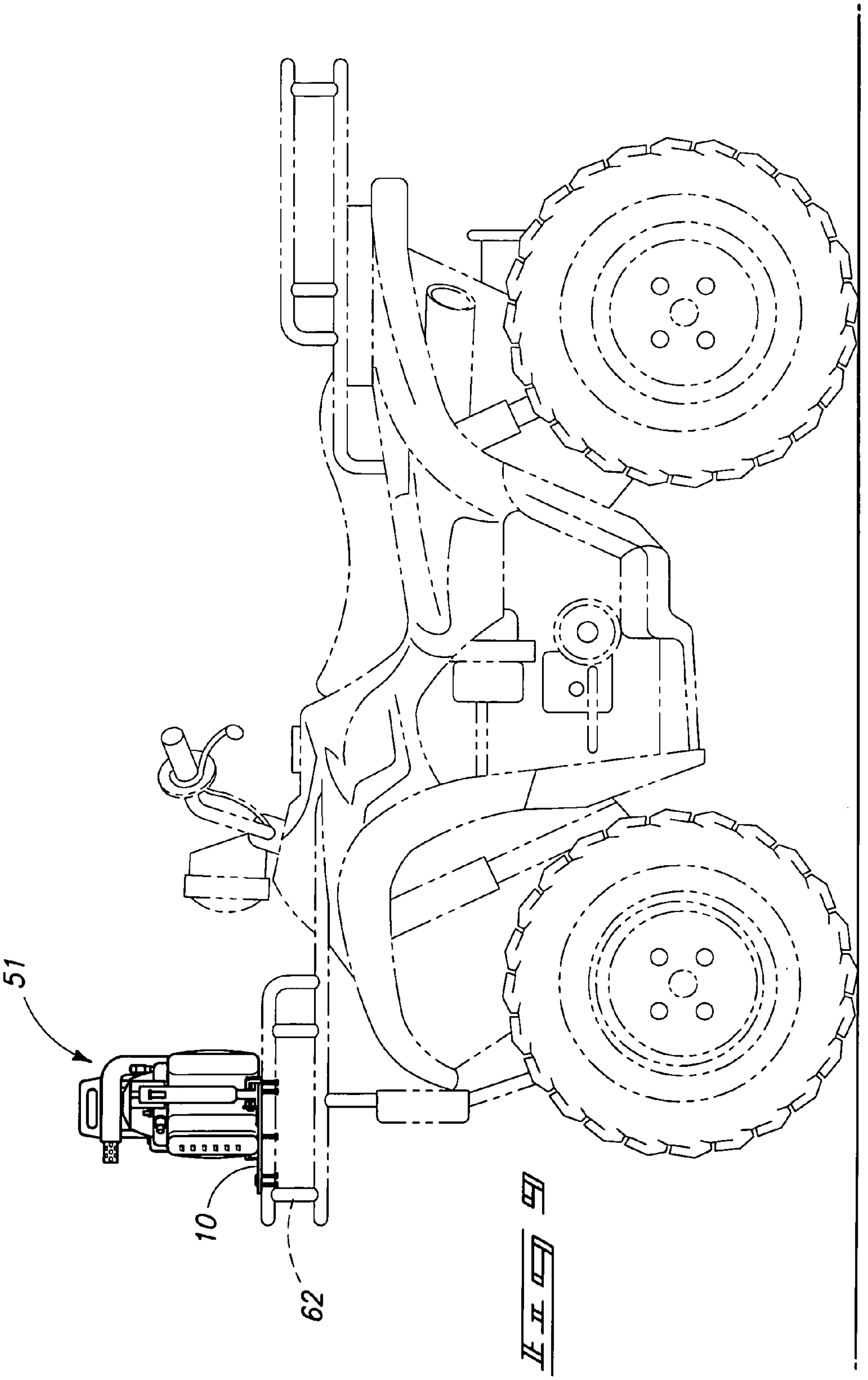
FIG. 9 is an alternative embodiment of the assembly of FIG. 8 coupled to the front portion of the all terrain vehicle.
Figure 10:
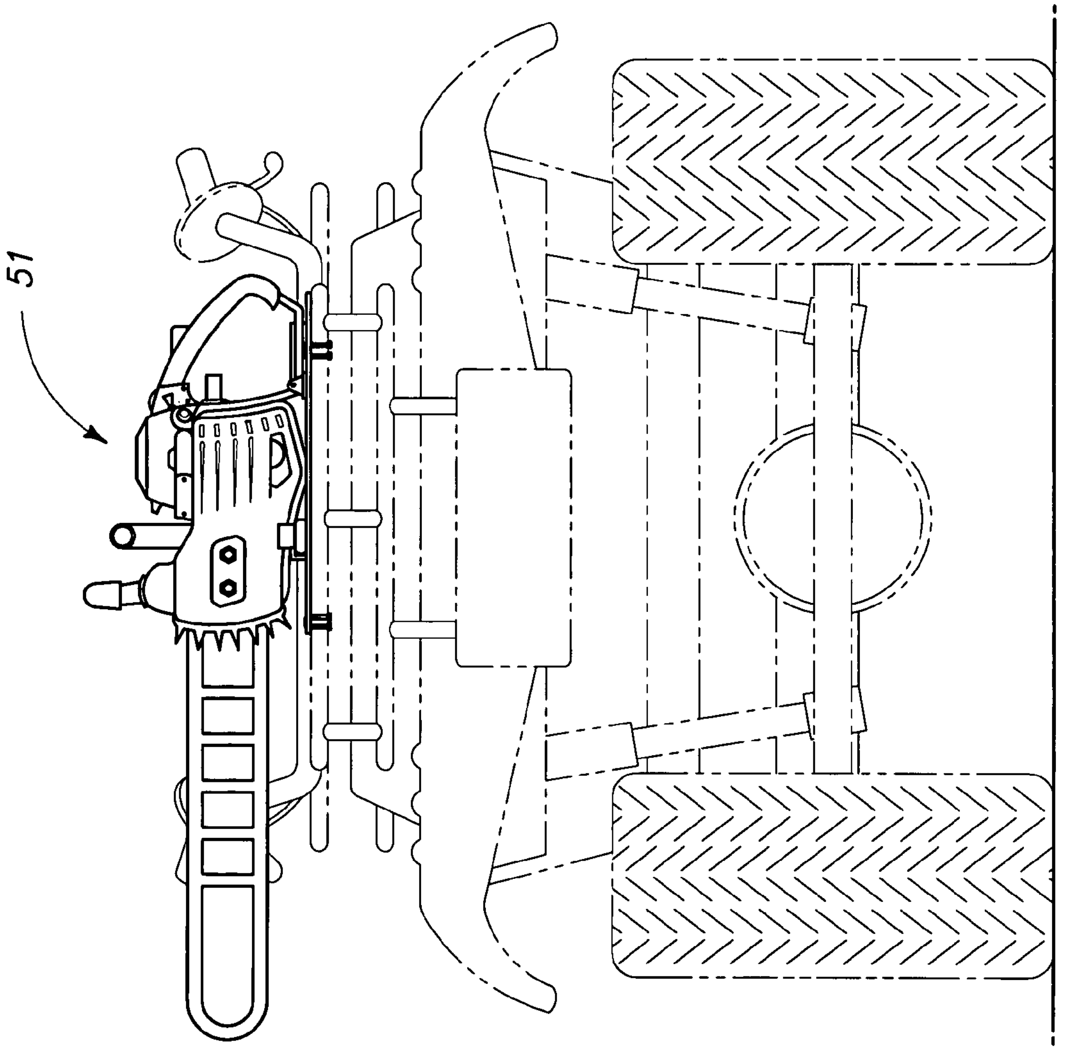
FIG. 10 is another view of the embodiment depicted in FIG. 9.

In accordance with another embodiment of the present disclosure and with reference to FIG. 9, mounting assembly 10 can be mounted across support structure 62 to allow for the positioning of the motor to one side of the ATV and the blade portion of saw 51 to another side of the ATV. Referring to FIG. 10, a front view of the configuration of FIG. 9 is shown.

Figure 11:
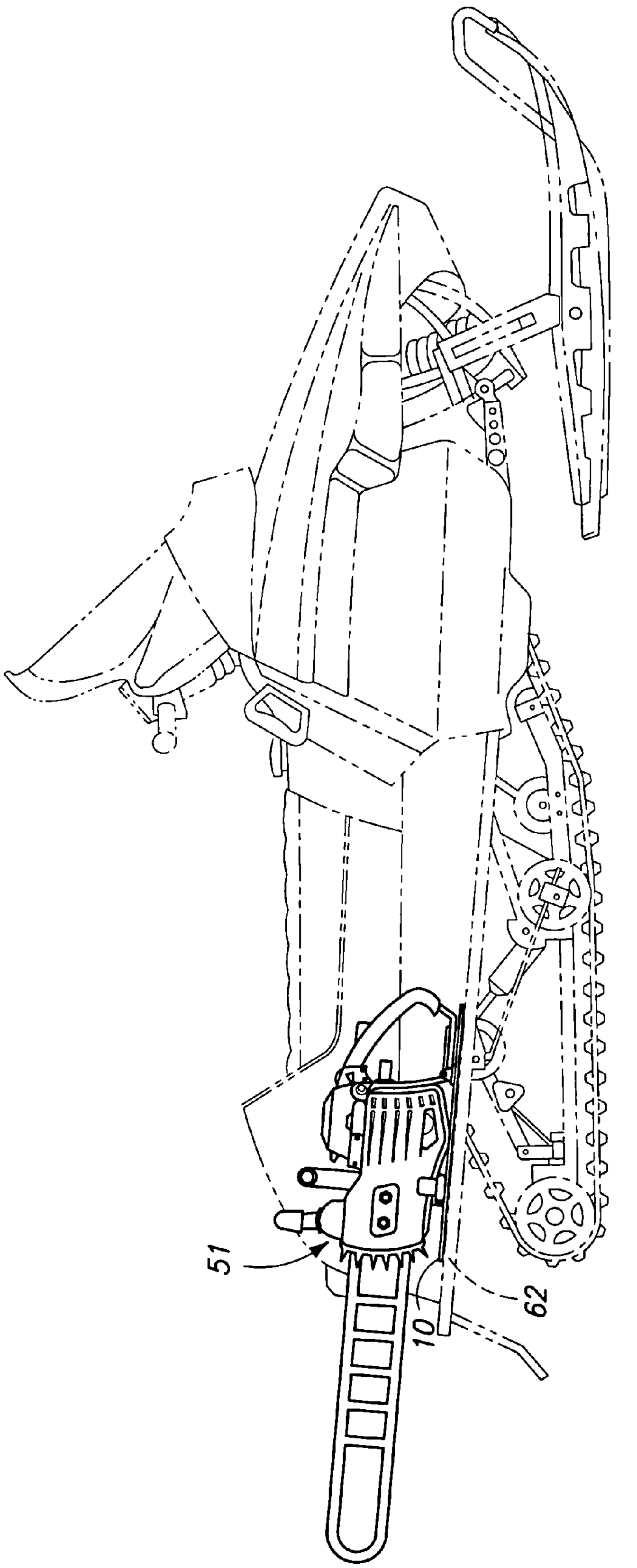
FIG. 11 is an example of an embodiment of an assembly of the present disclosure coupled to a snowmobile.

Referring to FIG. 11, assembly 10 can be mounted to a snowmobile. Accordingly the proximal portion of assembly 10 can be proximal the rider of the snowmobile and the distal portion can be away. According to an exemplary embodiment, the mounting of assembly 10 is along the side of the snowmobile.

Figure 12:
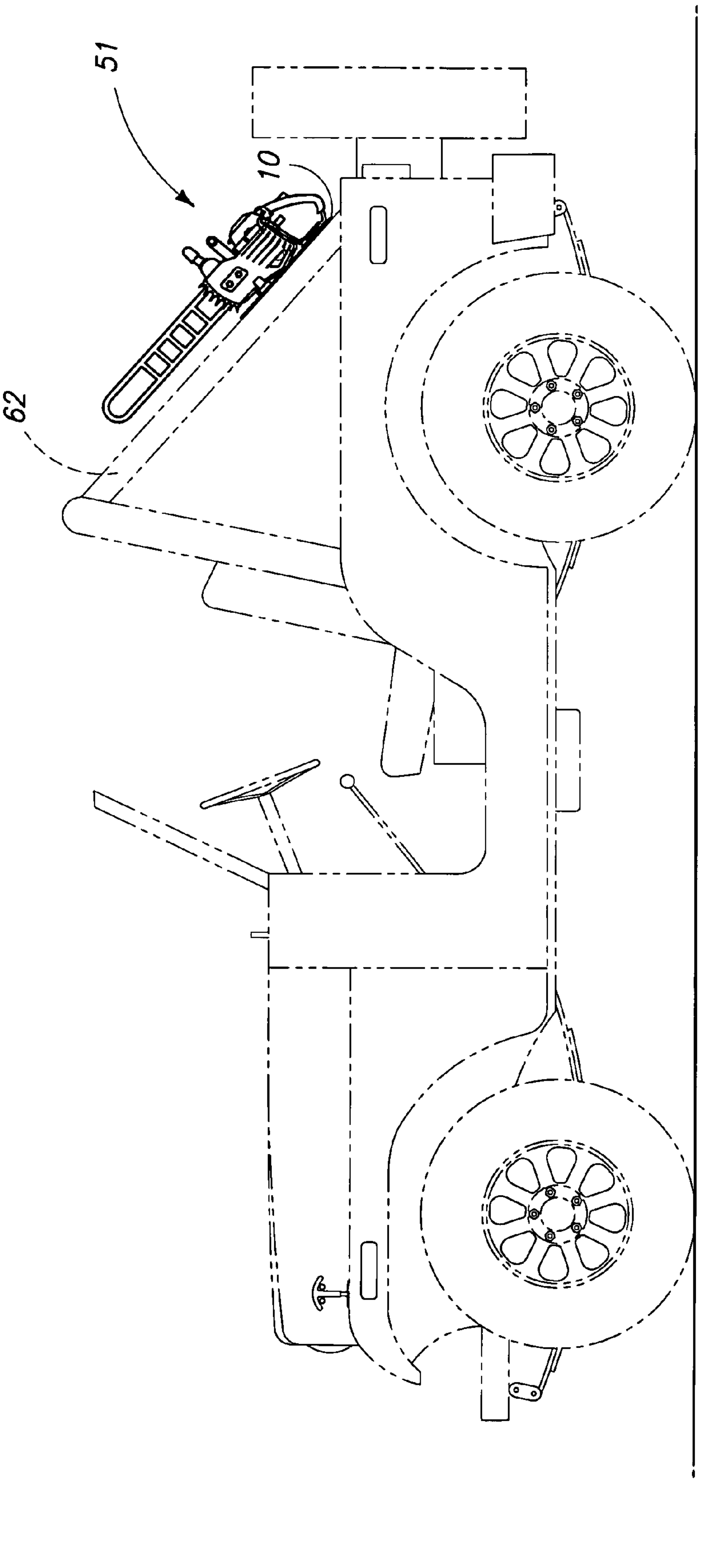
FIG. 12 is an example of an embodiment of an assembly of the present disclosure coupled to an off-road vehicle.

Referring to FIG. 12 and according to yet another embodiment, assembly 10 can be mounted to a jeep. According to one embodiment assembly 10 can be mounted at the roll bar. Actually the roll bar of a jeep can act as support structure 62 and assembly 10 can be mounted thereto.

Figure 13:
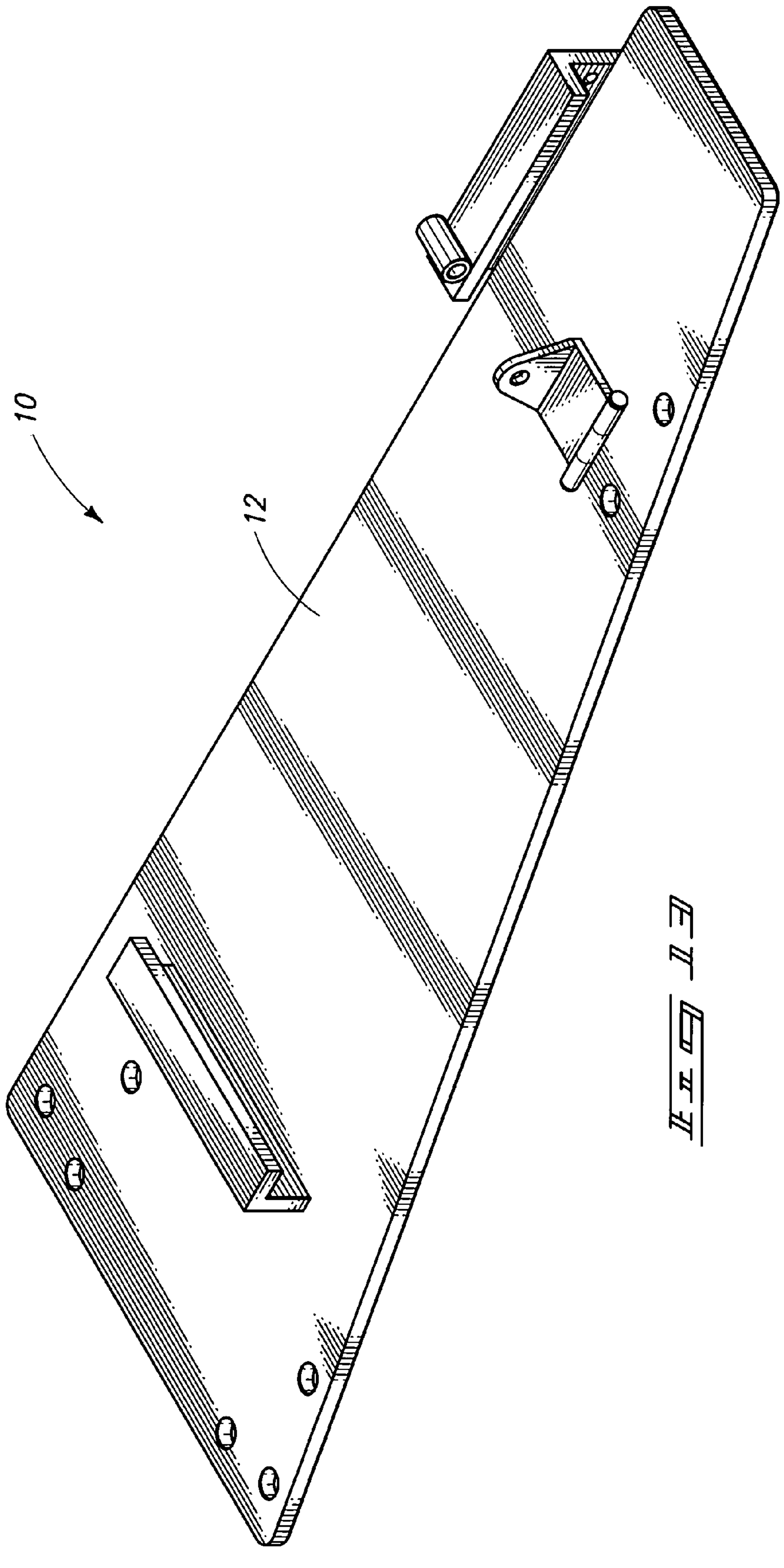
FIG. 13 is an example an assembly according to an embodiment of the disclosure.

Referring to FIG. 13, frame 12 of assembly 10 can be configured as a solid piece of metal having members 20 and 18 extending therefrom.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A handsaw mounting assembly comprising:

a planar support member having an upper surface;

a distal L-member extending normally from the upper surface with the top of the distal L-member extending substantially parallel to the upper surface in a direction toward the proximal portion of the support member, the distal member configured to engage a portion of a distal handle of a handsaw;

a proximal L-member extending normally from the upper surface with the top of the proximal L-member extending substantially parallel to the upper surface in a direction normal to the direction of the top of the distal L-member, the proximal member configured to engage a portion of a proximal handle of a handsaw; and a locking L-member hinged to the upper surface, the locking L-member associated with proximal L-member and configured to secure the proximal handle of the handsaw against the proximal L-member when in an engaged position, wherein both the locking L-member and the proximal L-member include openings aligned in the engaged position to receive a locking pin.

* * * * *